UNITED STATES PATENT OFFICE.

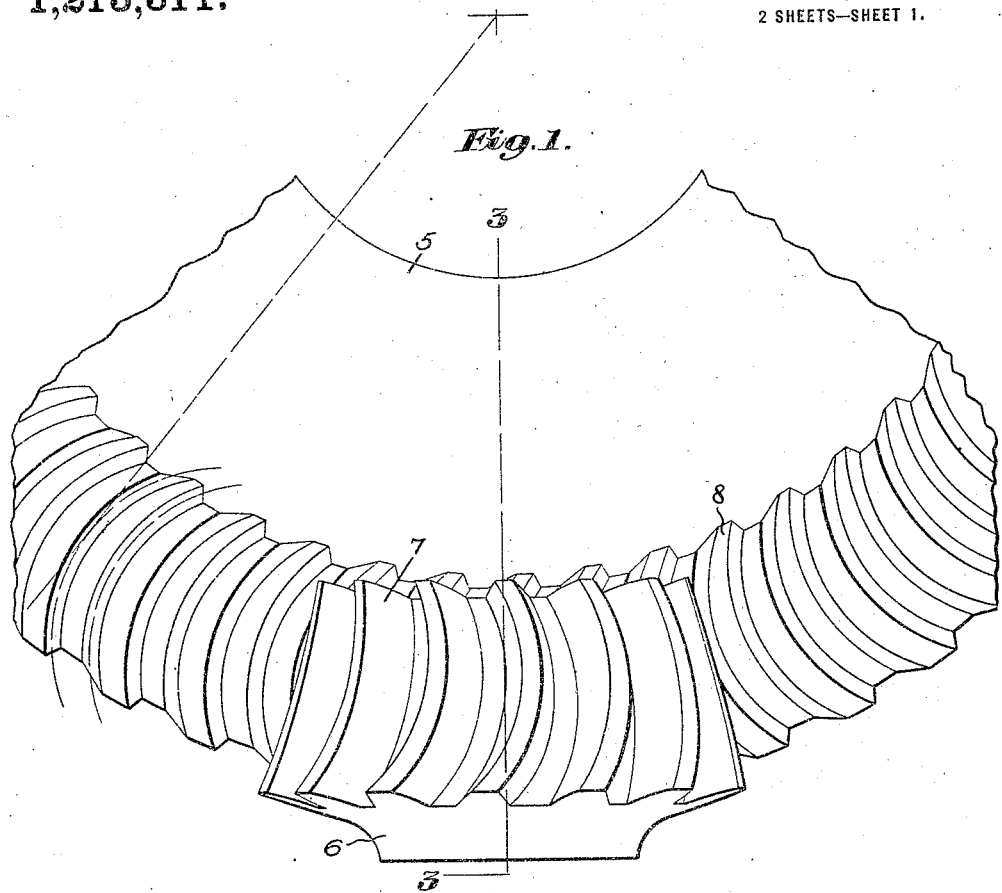
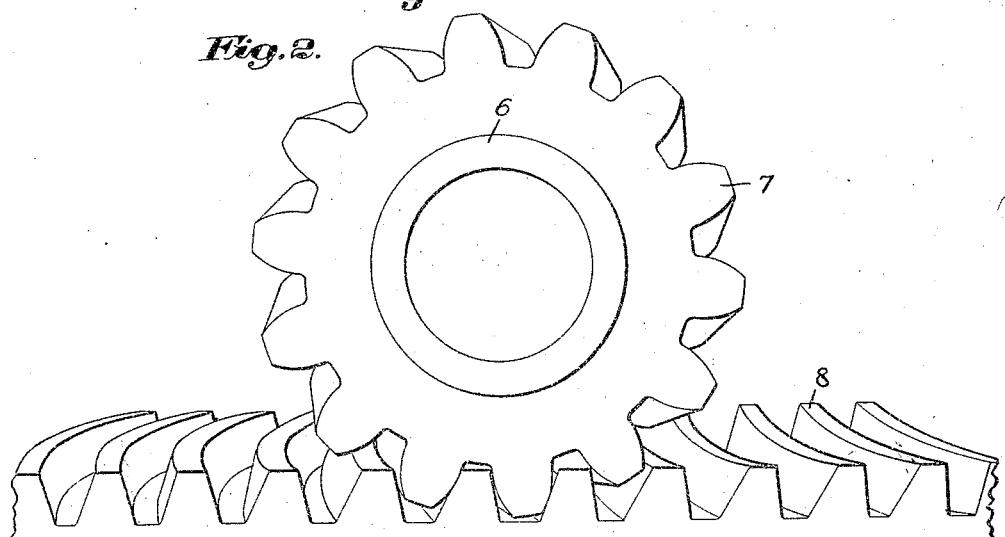

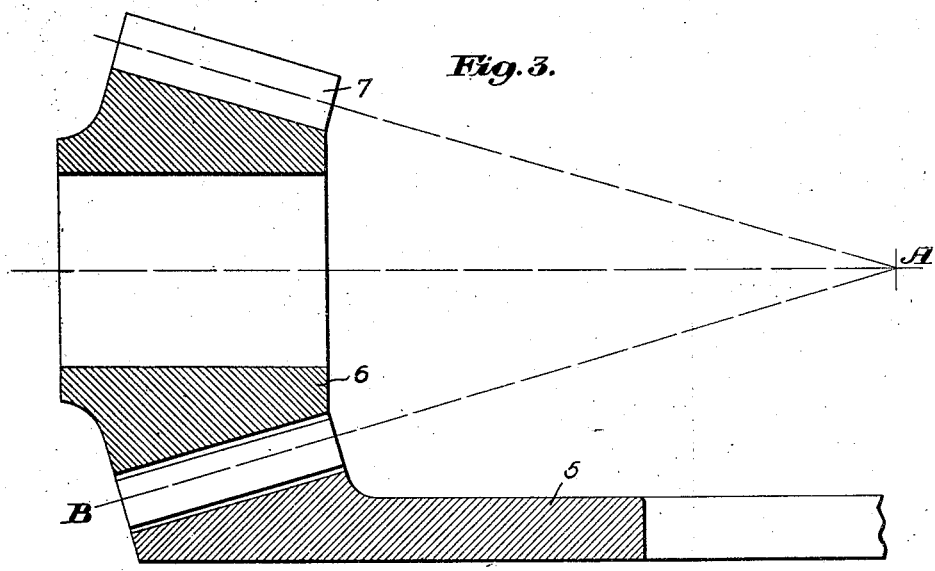
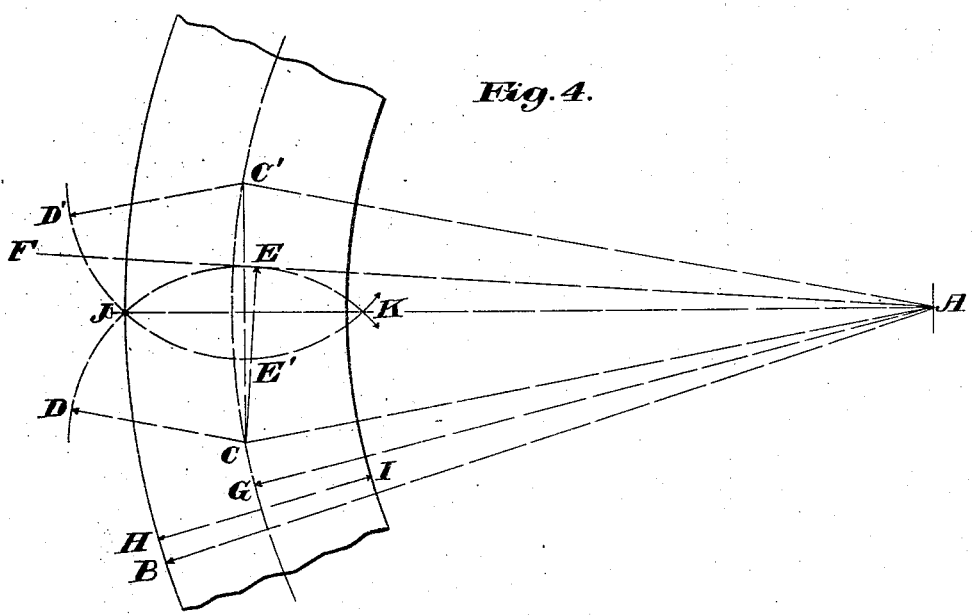

HENRY C. WALTER, OF BRIDGEPORT, CONNECTICUT, ASSIGNOR TO THE LOCOMOBILE COMPANY OF AMERICA, OF NEW YORK, N. Y., A CORPORATION OF WEST VIRGINIA.

GEARING.

1,213,311.  Specification of Letters Patent.  Patented Jan. 23, 1917.

Application filed April 19, 1915. Serial No. 22,231.

*To all whom it may concern:*

Be it known that I, HENRY C. WALTER, a citizen of the United States, and a resident of Bridgeport, county of Fairfield, and State of Connecticut, have invented an Improvement in Gearing, of which the following description, in connection with the accompanying drawings, is a specification, like characters on the drawings representing like parts.

This invention relates to toothed gearing, and is more especially concerned with bevel gearing of a special type, which is characterized by its practically noiseless operation, and the absence of end thrust.

My invention will be best understood by reference to the following specification, when taken in connection with the accompanying drawings of one specific embodiment thereof, while its scope will be more particularly pointed out in the appended claims.

In the drawings: Figure 1 is a plan of a portion of a bevel gear and a pinion embodying my invention; Fig. 2 is an elevation of the same, viewed from the outer end of the pinion; Fig. 3 is a sectional view, on line 3—3 of Fig. 2, looking toward the left; and Fig. 4 is a layout or diagram representing the mode of laying out the tooth curve on the development of the pitch gear.

It is well known that bevel gears of the common spur type, having straight teeth, are apt to be noisy in action, especially after having become somewhat worn, and attempts have heretofore been made to obviate this objectionable effect by the use of herringbone teeth, and by the use of the so-called spiral, or skew-cut, form of tooth. Both of these expedients, however, involve seriously objectionable features. The herringbone gear is difficult, as well as expensive, to make, and is weak along the median line of the gear face, while the so-called spiral or skew-cut bevel gear causes an end thrust on its bearings, with consequent wear and loss of power. Both of these objections are overcome in the gears which form the subject matter of this application, and which I will now describe.

Referring to the drawing, and to the embodiment of my invention which I have selected for illustration, I have there shown a bevel gear 5, and a pinion 6, whose pitch cones have a common axis A, while the line A—B in Fig. 3 represents an element common to the rolling surfaces of the two pitch cones. In other words, the line A—B represents the line of contact of the two imaginary cones.

The gear 5 is provided with teeth 7, and the pinion 6 with teeth 8, whose pitch and width of face may be suitable for the nature of the work to be performed, and the power to be transmitted. It is deemed unnecessary here to discuss the dimensions of the teeth, and the method employed in designing the form and angle of the tooth flank, since these matters are well known to those skilled in the art, and should require no further comment. It should be noted, however, that the teeth are of substantially uniform depth from end to end (Fig. 3), this being an important feature of my invention. This I regard as a matter of considerable practical importance, because not only is the cutting of the teeth greatly simplified, but great additional strength is attained. The spaces between the teeth will, of course, be provided with suitable clearances at the top and root thereof, as indicated in Fig. 3, and these clearance spaces also are preferably of substantially uniform depth from end to end.

Referring to Fig. 4, I have there shown a diagram representing graphically the laying out of the tooth curve on the development of the face of the gear. It should be here noted that each tooth is curved from end to end on an arc of a circle, and that the same radius is used for both sides of the tooth at the pitch line, or more correctly speaking, in the surface of the pitch cone. This radius may be represented by the line C—D in Fig. 4. The location of the center C, from which this radius is struck, may be arbitrarily selected within certain limits, the only essential, however, being that the point of tangency E of the arc to the radial line A—F, drawn from the cone center (Fig. 4), shall be intermediate the ends of the tooth,—that is to say, it should lie within the face of the gear.

It will be understood that when the point of tangency is located as just described, the two portions of the tooth on opposite sides of this point exert thrusts in opposite directions respectively, so that one counteracts the other in much the same sense that the opposed angular tooth surfaces of a herringbone type of gear oppose each other. In the example selected for illustration, the center C, from which the arc on the radius C—D is struck, is located in an arc struck from the center A on a radius A—G. The latter radius will, in practice, be determined arbitrarily. In the present instance, it is such that the point of tangency E is located somewhat nearer the inner end of the tooth,— that is to say, it is exactly midway between the ends of the tooth. The width of the face is indicated by the line H—I, intersecting the two arcs which represent the outer and inner limits of the gear face. If the teeth of the gear are cut right-hand, so to speak, the teeth of the pinion will be cut left-hand,— that is to say, viewing the face of the gear and pinion as seen in Fig. 1, for example, the uppermost teeth of the pinion have a curve which is opposite to that of the teeth of the gear. This is represented diagrammatically in Fig. 4, by laying out a second arc corresponding to the arc drawn on the radius C—D. This second arc, for the purpose of comparison, I have designated C'—D', its center C' being located within a circle struck on the radius A—G. The distance from the center C to the center C' in Fig. 4 is such that the arcs struck therefrom on the radii C—D and C'—D' intersect at a point J in the circle struck from the center A on the radius A—B, and which represents the outer circle of the gear face. It will now be observed that the two arcs struck from the centers C and C' have another point of intersection K, which falls outside of the gear face whose width is represented by the line H—I. As before stated, however, the distribution of the arc of the tooth within the width of the gear face is a matter of selection within certain limits already defined. In the present case, the point of tangency E is located somewhat nearer the inner circumference of the gear face than the outer, with the result that inward pressure of the teeth is very slightly greater than the outer pressure, the tendency therefore being to move the pinion toward the center of the gear. Although this is not at all necessary, it has been done in the present instance with a view to better distributing the wear on the flanks of the terminal portions of the teeth. This is a matter of judgment according to the circumstances of the particular case. It is found in practice, however, that the thrusts are opposed, or balanced in such a manner that the gears will run and transmit the desired amount of power, with actually no thrust bearings for the pinion. In fact, the latter may constitute in effect a floating member. It will thus be readily appreciated that the highest possible efficiency will be obtained from the gears, because the end thrust, with consequent wear and loss of power, may be totally eliminated.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof:

Having thus described my invention, what I claim and desire by Letters Patent to procure is:

1. A pair of mating bevel gears whose teeth are each curved from end to end and formed on an arc of a circle whose point of tangency to a radial line drawn from the cone center is intermediate the ends of such tooth.

2. A pair of mating bevel gears whose teeth are each curved from end to end and formed on an arc of a circle whose point of tangency to a radial line drawn from the cone center is approximately midway between the ends of such tooth.

3. A pair of mating bevel gears whose teeth are of substantially uniform depth from end to end and are each curved from end to end and formed on an arc of a circle whose point of tangency to a radial line drawn from the cone center is intermediate the ends of such tooth.

4. As a new article of manufacture, a bevel gear whose teeth are each curved from end to end and are formed on an arc of a circle whose point of tangency to a radial line drawn from the cone center of the gear is intermediate the ends of such tooth.

5. A pair of mating bevel gears whose teeth are each curved from end to end and formed on an arc of a circle whose point of tangency to a radial line drawn from the cone center is intermediate the inner end and the middle of such tooth.

In testimony whereof, I have signed my name.

HENRY C. WALTER.

Copies of this patent may be obtained for five cents each, by addressing the "Commissioner of Patents, Washington, D. C."